United States Patent

Undin

[11] Patent Number: 5,345,681
[45] Date of Patent: Sep. 13, 1994

[54] TOOL FOR STRIPPING A CONDUCTOR

[75] Inventor: Hans Undin, Akersberga, Sweden

[73] Assignee: Weidmuller Interface GmbH & Co., Detmold, Fed. Rep. of Germany

[21] Appl. No.: 10,835

[22] Filed: Jan. 29, 1993

[30] Foreign Application Priority Data

Feb. 12, 1992 [DE] Fed. Rep. of Germany ....... 4204141

[51] Int. Cl.[5] .............................................. H02G 1/12
[52] U.S. Cl. ........................................ 30/90.7; 30/90.4; 81/9.4
[58] Field of Search ............... 30/90.6, 90.7, 90.8, 30/90.1; 81/9.4

[56] References Cited

U.S. PATENT DOCUMENTS

| | | | |
|---|---|---|---|
| 1,866,095 | 7/1932 | Foley | 30/90.7 |
| 3,483,617 | 12/1969 | Krampe | 30/90.7 |
| 3,881,249 | 5/1975 | Cox, Jr. | 30/90.7 |
| 4,526,068 | 7/1985 | Undin et al. | 81/9.4 |

Primary Examiner—Richard K. Seidel
Assistant Examiner—Hwei-Siu Payer
Attorney, Agent, or Firm—Birch, Stewart, Kolasch & Birch

[57] ABSTRACT

A tool according to the invention for stripping a conductor contains a handle element, a cutter piece, which is in the form of a rod, is supported on the handle element side and has a tip, in the form of a blade, which can be moved around a rotation axis at a distance, and an opposing bearing, which is arranged on the handle element, for holding the conductor. A supporting body is supported on the handle element, which supporting body can rotate about the rotation axis and in which the cutter piece extends with its longitudinal direction inclined with respect to the rotation axis.

44 Claims, 2 Drawing Sheets

TOOL FOR STRIPPING A CONDUCTOR

BRIEF DESCRIPTION OF THE INVENTION

1. Field of the Invention

The invention relates to a tool for stripping a conductor.

2. Description of Background Art

Such a tool is already generally known and contains a cutter piece, which is constructed in the form of a rod, in the interior of a handle element, which cutter piece extends over the entire length of the handle element and, at its tip, has a blade which projects out of the handle element. The blade is arranged laterally offset with respect to the remaining part of the cutter piece, so that, when the cutter piece rotates, the blade revolves on a circular track around the longitudinal axis of said cutter piece. An opposing bearing which is arranged in the handle element is used for holding the conductor and is located opposite the tip of the cutter piece, which tip is in the form of a blade.

If the conductor is clamped in between the opposing bearing and the tip of the cutter piece, which tip is in the form of a blade, its insulation can be cut off with the aid of the blade, if the tool is rotated around the conductor in a plane lying at right angles to the conductor longitudinal direction. Since the tip of the cutter piece is bent, the plane of the blade is likewise in the movement plane of the tool.

If, after cutting through the insulation of the conductor, the workpiece and conductor are moved relative to one another in the longitudinal direction of the conductor, the plane of the blade is positioned at right angles to the previously mentioned radial plane. In consequence, on the one hand the cut-off parts of the insulation are separated from one another, while on the other hand the remaining insulation on the conductor end can be slotted in the longitudinal direction of the conductor.

In general, the plane of the blade is always located in that plane in which the tip of the cutter piece, which is in the form of a rod, is bent or cranked.

As already mentioned, in the known tool, the cutter piece, which is in the form of a rod, runs through the entire handle element so that it is relatively complicated to replace the cutter piece. Specifically, the entire handle element must be dismantled for this purpose. However, because of its great length, the cutter piece is also relatively expensive. Furthermore, a costly procedure is required to bend the cutter piece in its tip region.

SUMMARY AND OBJECTS OF THE INVENTION

The invention is based on the object of creating a tool of the type mentioned initially in which the cutter piece can be replaced more easily and which furthermore can be produced more simply and cheaply.

A tool according to the invention is distinguished in that a supporting body is supported on the handle element, which supporting body can rotate about the rotation axis and in which the cutter piece runs with its longitudinal direction inclined with respect to the rotation axis.

The cutter piece and the supporting body are detachably connected to one another and form a structural unit which is only short. The supporting body is supported at the upper end of the handle element and can be removed relatively easily when the blade of the cutter piece is worn out after relatively long use. Replacement of the cutter piece is thus possible without problems, Without the handle element having to be dismantled.

Since the cutter piece is located inclined with respect to the rotation axis of the supporting body, it no longer needs to be bent itself, so that it can be produced easily and cheaply as a straight piece, in the form of a rod, having a relatively short length.

According to one advantageous refinement of the invention, the supporting body is constructed as a cylinder whose cylinder axis forms the rotation axis. In this case, the cutter piece preferably runs through the end surfaces of the cylinder.

A cylindrical supporting body can be produced in a particularly simple manner and ensures good guidance in a correspondingly constructed bearing sleeve, and hence also good guidance of the cutter piece, which increases the operating reliability of the tool. Since the cutter piece passes only through the cylinder end surfaces, the end circumferential edge regions of the cylinder, in particular, are fully available for guidance and positioning purposes.

According to another advantageous refinement of the invention, the end, averted from the tip, in the form of a blade, of the cutter piece has radial attachments which engage in the wall of the supporting body. The radial attachments are used, as it were, as rotation protection for the cutter piece in order to prevent the cutter piece rotating relative to the supporting body.

In this case, the end, averted from the tip in the form of a blade, of the cutter piece can also be constructed as a bearing head in order to ensure that the structural unit consisting of a cutter piece and supporting body is supported with as little friction as possible. The bearing head thus overhangs the adjacent end of the supporting body by a small amount in order to prevent this end of the supporting body being in frictional contact with a base.

According to another advantageous development of the invention, the supporting body has a circumferential groove for holding a clamping ring. This clamping ring is used for axially securing the supporting body in the bearing sleeve. In this case, the bearing sleeve can be rigidly connected to the handle element.

The sleeve is advantageously sealed by a screw cap through which the head of the supporting body projects, a compression spring which surrounds the supporting body and presses the clamping ring against an inner circumferential step on the sleeve being arranged between the screw cap and the clamping ring.

In other words, the compression spring is supported on the screw cap and holds the clamping ring on the inner circumferential step of the sleeve, so that the supporting body cannot fall out of the sleeve, since its rear attachment, which is held because of the circumferential groove, engages behind the clamping ring. The clamping ring can also be constructed in the form of an annular disc which has a radial opening at one point in order to be able to be pushed onto the supporting body in the groove region.

The supporting body and cutter piece are furthermore not pressed against the base of the sleeve by the clamping ring, which can be secured by suitable positioning of the circumferential groove, so that slight rotation of the supporting body, as before, is also possible when the clamping ring is pressed against the circumferential step.

The supporting body and sleeve may consist of plastic and are hence manufactured easily and cheaply.

For the case of a sleeve consisting of plastic, a wear-resistant plate for holding the bearing head of the cutter piece can be located on the sleeve base in order, on the one hand, to save the sleeve from damage and on the other hand to reduce the friction between the bearing head and the sleeve.

In addition, a further compression spring which presses the opposing bearing over a flange to the handle element can be supported on the underneath of the base of the sleeve, the opposing bearing then occupying the quiescent position. If a conductor is clamped in between the opposing bearing and the cutter piece, then the opposing bearing is displaced upwards by hand and against the force of the further compression spring.

BRIEF DESCRIPTION OF THE DRAWINGS

The invention is described in more detail in the following text with reference to the drawing, in which.

DETAILED DESCRIPTION OF THE PREFERRED EMBODIMENTS

Figure 1:
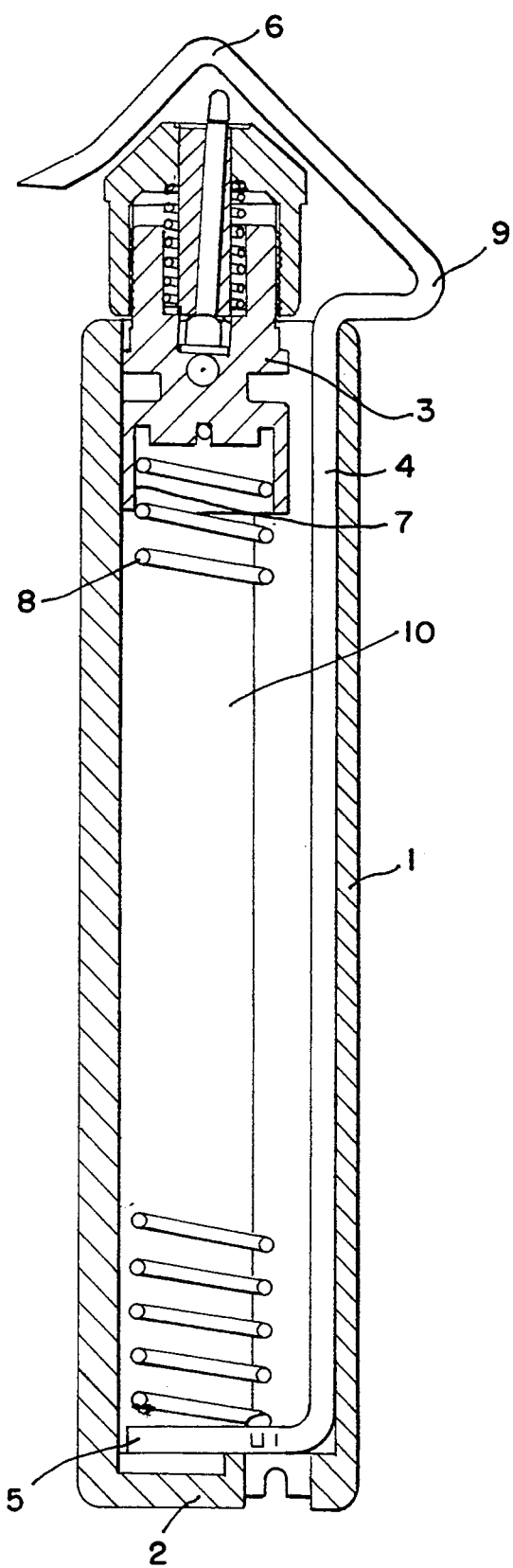
FIG. 1 shows an axial section through the tool.

According to FIG. 1, a tool according to the invention for stripping a conductor contains a handle element 1 which consists of an elongated housing and is produced, for example, from plastic. The lower end of the handle element 1 is sealed by a base 2, while the upper end of the handle element 1 is open. The handle element 1 may, for example, have a rectangular external cross-section.

Located at the upper and open end of the handle element 1 is a sleeve element 3, part of which projects into the handle element 1 and another part of which externally overhangs the handle element 1 at the end. The sleeve element 3 is firmly connected to the handle element 1 and thus cannot move relative thereto. However, if required, it can be removed from the handle element 1.

Located laterally with respect to the sleeve element 3 is a metal rail 4 which has a rectangular cross-section, for example, and extends on the inner wall of the handle element 1 as far as the base 2. The metal rail 4 is bent at right angles there in order to form a flange 5, the flange 5 coming to rest on the base 2. At the upper end of the handle element 1, the metal rail 4 is bent like a pitched roof in order to form an opposing bearing 6 for a conductor (not shown) which is to be stripped. The apex of the roof of the opposing bearing 6 in this case comes to rest on the central or symmetry line of the sleeve element 3.

The lower end, located in the handle element 1, of the sleeve element 3 has a holder 7 for a compression spring 8 which is so long that it presses against the flange 5, located on the base 2, of the metal rail 4. In other words, the opposing bearing 6 is pressed by the compression spring 8 in the direction of the handle element 10. If a conductor which is to be stripped is placed into the apex of the roof, or into the opposing bearing 6, the latter is displaced by hand against the force of the compression spring 8 in the longitudinal direction of the handle element 1, to be precise acting on a lateral roof attachment 9. When the roof attachment 9 is released, the conductor which is located in the opposing bearing 6 is then pressed against a cutter piece, which is described in more detail later. A cylindrical hollow channel 10, which is used for holding the compression spring 8, can be located in the interior of the handle element 1 in order to stabilise the compression spring 8.

Figure 2A:
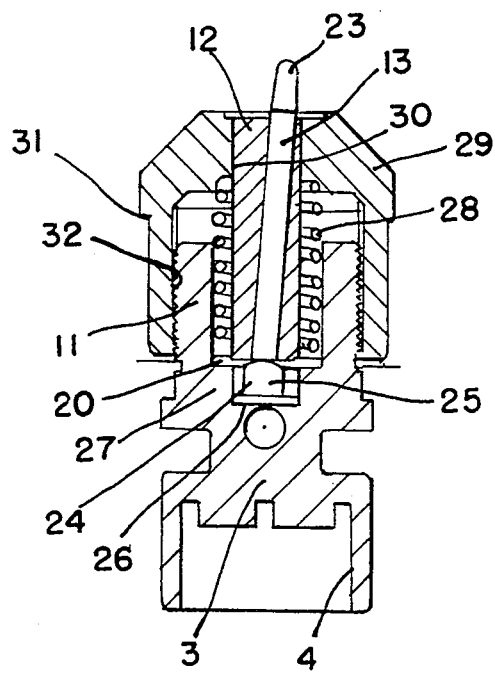
FIG. 2a shows an axial section through the supporting body and a bearing sleeve.

FIG. 2a shows an axial section through the tool in the region of the sleeve element 3. At its upper end, opposite the holder 7, the sleeve element 3 is provided with a sleeve 11 which is used for holding a supporting body 12 for a cutter piece 13.

Figure 3A:
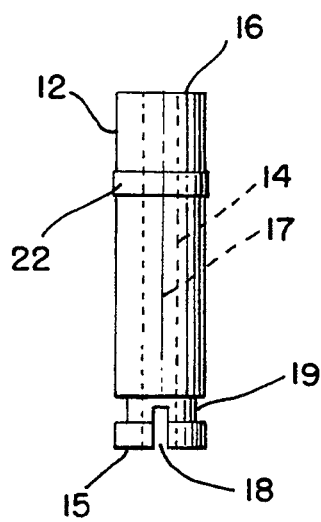
FIGS. 3a to 3c show a side view, an axial section and a plan view of the supporting body.
Figure 3B:
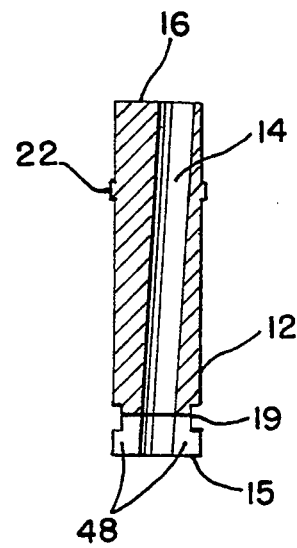
Figure 3C:
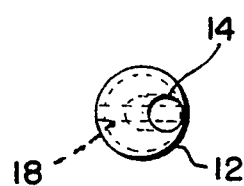

It is intended to explain the construction of the supporting body 12 in more detail in the following text, initially making reference to the FIGS. 3a to 3c.

Figure 2B:
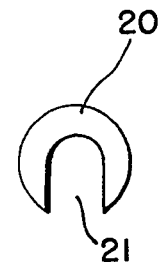
FIG. 2b shows a clamping ring.

The supporting body 12 consists of a plastic cylinder which is provided with an internal channel 14 which runs from a lower end 15 of the supporting body 12 to an upper end 16 of the supporting body 12. The internal channel 14 is in this case inclined with respect to the cylinder axis 17, the internal channel 14 starting centrally at the lower end 15 and ending at the upper end 16 in the vicinity of the external edge region of the supporting body 12. Furthermore, there are radial slots 18 in the circumferential wall of the supporting body 12 in the region of the lower end 15, which radial slots are connected to the internal channel 14. In addition, in the vicinity of the lower end 15, the supporting body 12 has a circumferential groove 19, which is used for holding a clamping ring 20 which is shown in FIG. 2b. The clamping ring 20 has a uniform thickness and can be pushed onto the supporting body 12 in the region of the groove 19, for which purpose the clamping ring 20 has a radial opening 21 whose width corresponds to the external diameter of the supporting body 12 in the region of the groove 19. Furthermore, at the end, facing the upper end 16, of the supporting body 12, a circumferential bead 22 can be provided which is used for guiding the supporting body 12.

As can be seen in FIG. 2a, the cutter piece 13 is located in the internal channel 14 of the supporting body 12. The cutter piece 13 has a tip 23, in the form of a blade, which, except for the connecting region to the cutter piece 13, has a cutting edge which is circumferential or lies in a plane. At the other end of the cutter piece 13, said cutter piece is, for example, pinched out to form radial attachments 24. The cutter tip 23, which is in the form of a blade, and the attachments 24 are, for example, located in the same plane. These radial attachments 24 engage into the radial slots 18, once the cutter piece 13 with its tip 23 has been pushed completely into the internal channel 14, to be precise from the lower end 15. Rotation security of the cutter piece 13 in the supporting body 12 is achieved by means of the radial attachments 24. The lower, or free, end of the attachment which is achieved by means of pinching forms a bearing head 25 for the cutter piece 13 and overhangs the supporting body 12 by a small amount downwards. This bearing head 25 rests on a wear-resistant plate 26 which consists, for example, of steel and is located on the base of the sleeve 11.

The wear-resistant plate 26 is located in a central recess in the sleeve 11, which is bounded by a circumferential step 27. The sleeve 11 expands above the circumferential step 27 and has a larger diameter there. The supporting body 12 is inserted with its lower part fitting into the central recess. The clamping ring 20, which is located in the region of the groove 19 of the supporting body 12, comes to rest on the circumferential step 27 and is pressed against the circumferential step 27 with the aid of a compression spring 28, which surrounds the supporting body 12. The compression spring 28 is supported internally on a screw cap 29, which has a central opening 30 through which the supporting body 12 runs. It is guided in the central opening 30 without play. The screw cap has an internal thread 31 by means of which it can be screwed onto an external thread 32 on the sleeve 11. The external diameter of the compression spring 28 in this case corresponds to the internal diameter of the upper part of the sleeve 11, so that the compression spring 28 is guided in this manner.

The following text describes how the structural unit which is shown in FIG. 2a is assembled.

The wear-resistant plate 26 is initially inserted into the central opening in the sleeve 11 of the sleeve element 3. The clamping ring 20 is then plugged onto the supporting body 12, into which the cutter piece 13 has already been completely pushed, to be precise in the region of the groove 19 of the supporting body 12. The supporting body 12 and clamping ring 20 are then inserted into the sleeve 11 in such a manner that the lower end of the supporting body 12 comes to rest in the central opening in the sleeve 11, and the clamping ring 20 comes to rest on the circumferential step 27. Subsequently, the compression spring 28 is plugged onto the supporting body 12 and inserted into the sleeve 11, so that it comes to rest on the clamping ring 20. Thereafter, the screw cap 29 is placed on, its internal thread 31 being screwed onto the external thread 32 on the sleeve 11. In this case, care must be taken to ensure that the upper part of the supporting body 12 is inserted into the central opening 30.

When the screw cap 29 is being tightened, the compression spring 28 presses against the clamping ring 20 so that the supporting body 12 can no longer fall out of the sleeve 11, since the part of the supporting body 12 located underneath the clamping ring 20 has a larger diameter than the internal diameter of the clamping ring 20. In other words, the supporting body 12 is held in the sleeve 11 by the clamping ring 20. In this case, part of the supporting body 12 located underneath the clamping ring 20 has, however, only such a length that the clamping ring 20 does not press the supporting body 12 against the wear-resistant plate 26. Rather, the supporting body 12 can also then still rotate freely and very easily, with the cutter piece 13 about central axis 17, when the screw cap 29 is firmly tightened.

The structural unit shown in FIG. 2a can then be connected to the handle element, the compression spring 8 being installed first. However, it is also possible to replace the supporting body 12 once the sleeve element 3 has been firmly connected to the handle element 1. In this case, it is necessary only to release the screw cap 29 so that the supporting body 12 can be removed with the cutter piece 13. In this way, simple replacement of the cutter piece 13 is possible, said cutter piece 13 merely having to be pressed out of the removed supporting body 12 and replaced by another.

The cutter piece 13 may consist, for example, of hardened steel and have a length of 2 to 2.5 cm. It consists of a straight piece in the form of a rod and can be produced in a particularly simple manner.

The screw cap 29 consists of metal, for example of brass, is constructed conically in its tip region and is provided with knurling.

I claim:

1. A tool for stripping a conductor comprising:
   a handle element;
   a cutter piece supported on a first end of said handle element, said cutter piece having a tip in the form of a blade, the blade being movable around a rotation axis at a predetermined distance therefrom;
   an opposing bearing arranged on the handle element for holding the conductor; and
   a supporting body supported on the first end of the handle element, said supporting body being rotatably mounted about the rotation axis for rotation during stripping of a conductor, wherein said cutter piece is positioned within said supporting body with its longitudinal axis inclined with respect to the rotation axis, wherein an end of the cutter piece opposing the tip includes radial attachments for engaging an inner wall of the supporting body.

2. The tool according to claim 1, wherein the supporting body is a cylinder having a cylinder axis for defining the rotation axis.

3. The tool according to claim 2, wherein the supporting body has a circumferential groove for holding a clamping ring.

4. The tool according to claim 3, wherein the supporting body is supported in a sleeve which is rigidly connected to the handle element.

5. The tool according to claim 4, wherein the sleeve is sealed by a screw cap through which a head of the supporting body projects, and wherein a compression spring which surrounds the supporting body and presses the clamping ring against an inner circumferential step on the sleeve is arranged between the screw cap and the clamping ring.

6. The tool according to claim 3, wherein the sleeve is constructed of plastic.

7. The tool according to claim 5, wherein a further compression spring for pressing the opposing bearing over a flange to the handle element is supported on the underneath of a base of the sleeve.

8. The tool according to claim 2, wherein the cutter piece projects through end surfaces of the cylinder.

9. The tool according to claim 8, wherein the end, averted from the tip in the form of a blade, of the cutter piece is constructed as a bearing head.

10. The tool according to claim 9, wherein the supporting body is supported in a sleeve which is rigidly connected to the handle element.

11. The tool according to claim 10, wherein the sleeve is constructed of plastic.

12. The tool according to claim 10, wherein a wear-resistant plate for holding the bearing head of the cutter piece is located on an internal base of the sleeve.

13. The tool according to claim 8, wherein the supporting body is supported in a sleeve which is rigidly connected to the handle element.

14. The tool according to claim 1, wherein the supporting body is constructed of plastic.

15. The tool according to claim 14, wherein the supporting body is supported in a sleeve which is rigidly connected to the handle element.

16. The tool according to claim 1, wherein the end, averted from the tip in the form of a blade, of the cutter piece is constructed as a bearing head.

17. The tool according to claim 1, wherein the supporting body has a circumferential groove for holding a clamping ring.

18. The tool according to claim 1, wherein the supporting body is supported in a sleeve which is rigidly connected to the handle element.

19. A tool for stripping a conductor comprising:
a handle element;
a cutter piece supported on a first end of said handle element, said cutter piece having a tip in the form of a blade, the blade being movable around a rotation axis at a predetermined distance therefrom;
an opposing bearing arranged on the handle element for holding the conductor; and
a supporting body supported on the first end of the handle element, said supporting body being rotatably mounted about the rotation axis for rotation during stripping of a conductor, wherein said cutter piece is positioned within said supporting body and with its longitudinal axis inclined with respect to the rotation axis.

20. The tool according to claim 1, wherein the supporting body is a cylinder having a cylinder axis for defining the rotation axis.

21. The tool according to claim 20, wherein the cutter piece projects through end surfaces of the cylinder.

22. The tool according to claim 21, wherein the end, averted from the tip in the form of a blade, of the cutter piece is constructed as a bearing head.

23. The tool according to claim 22, wherein the supporting body is supported in a sleeve which is rigidly connected to the handle element.

24. The tool according to claim 21, wherein the end, averted from the tip in the form of a blade, of the cutter piece has radial attachments for engaging in the wall of the supporting body.

25. The tool according to claim 21, wherein the supporting body is supported in a sleeve which is rigidly connected to the handle element.

26. The tool according to claim 19, wherein an end of the cutter piece opposing the tip includes radial attachments for engaging an inner wall of the supporting body.

27. The tool according to claim 26, wherein the end, averted from the tip in the form of a blade, of the cutter piece is constructed as a bearing head.

28. The tool according to claim 26, wherein the supporting body has a circumferential groove for holding a clamping ring.

29. The tool according to claim 26, wherein the supporting body is supported in a sleeve which is rigidly connected to the handle element.

30. The tool according to claim 20, wherein the supporting body has a circumferential groove for holding a clamping ring.

31. The tool according to claim 30, wherein the supporting body is supported in a sleeve which is rigidly connected to the handle element.

32. The tool according to claim 20, wherein the supporting body is supported in a sleeve which is rigidly connected to the handle element.

33. The tool according to claim 32, wherein the sleeve is sealed by a screw cap through which a head of the supporting body projects, and in that a compression spring which surrounds the supporting body and presses the clamping ring against an inner circumferential step on the sleeve is arranged between the screw cap and the clamping ring.

34. The tool according to claim 33, wherein the sleeve is constructed of plastic.

35. The tool according to claim 33, wherein a further compression spring for pressing the opposing bearing over a flange to the handle element, is supported on the underneath of a base of the sleeve.

36. The tool according to claim 32, wherein the sleeve is constructed of plastic.

37. The tool according to claim 36, wherein a wear-resistant plate for holding the bearing head of the cutter piece is located on an internal base of the sleeve.

38. The tool according to claim 37, wherein a further compression spring for pressing the opposing bearing over a flange to the handle element, is supported on the underneath of a base of the sleeve.

39. The tool according to claim 36, wherein a further compression spring for pressing the opposing bearing over a flange to the handle element, is supported on the underneath of a base of the sleeve.

40. The tool according to claim 32, wherein a further compression spring for pressing the opposing bearing over a flange to the handle element, is supported on the underneath of a base of the sleeve.

41. The tool according to claim 20, wherein the cutter piece projects through end surfaces of the cylinder.

42. The tool according to claim 20, wherein the end, averted from the tip in the form of a blade, of the cutter piece has radial attachments for engaging in the wall of the supporting body.

43. The tool according to claim 19, wherein the supporting body is constructed of plastic.

44. The tool according to claim 43, wherein the supporting body is supported in a sleeve which is rigidly connected to the handle element.

* * * * *